(12) United States Patent
Sato (10) Patent No.: US 6,532,307 B1
(45) Date of Patent: Mar. 11, 2003

(54) IMAGE RETRIEVAL BY COMPARING WAVELET ENCODED DATABASE IMAGES WITH INPUT SHAPES

(75) Inventor: Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,049

(22) Filed: Jul. 28, 1999

(30) Foreign Application Priority Data

Jul. 28, 1998 (JP) .......................................... 10-213251

(51) Int. Cl.[7] .............................. G06K 9/36; G06K 9/46
(52) U.S. Cl. ...................... 382/240; 382/243; 382/305
(58) Field of Search ................................ 382/199, 209, 382/218, 219, 220, 240, 243–247, 305, 306; 358/403; 207/3, 101, 104.1

(56) References Cited

U.S. PATENT DOCUMENTS

| | | | | |
|---|---|---|---|---|
| 5,163,101 A | * | 11/1992 | Deering | 382/216 |
| 5,638,465 A | * | 6/1997 | Sano et al. | 382/159 |
| 5,905,807 A | * | 5/1999 | Kado et al. | 382/199 |
| 5,915,038 A | * | 6/1999 | Abdel-Mottaleb et al. | 382/209 |
| 6,229,927 B1 | * | 5/2001 | Schwartz | 382/240 |
| 6,269,192 B1 | * | 7/2001 | Sodagar et al. | 382/240 |

* cited by examiner

*Primary Examiner*—Timothy M. Johnson
(74) *Attorney, Agent, or Firm*—Fitzpatrick, Cella, Harper & Scinto (57) ABSTRACT

Since images stored in an image database are encoded, they must be decoded to detect their features. For this reason, when the number of test images is large or each image size is large, the search speed lowers. To solve this problem, a shape information generation unit (4) generates query data on the basis of an image shape input by a shape input unit (3). A comparison unit (5) compares the query data with encoded data of an image read out from an image database (1). If similarity between these two data is high, the comparison unit makes a decoder (6) decode the encoded data of the image; if the similarity is low, it requests the input unit (2) to input encoded data of the next image.

20 Claims, 8 Drawing Sheets

COMPARISON RESULT

IMAGE RETRIEVAL BY COMPARING WAVELET ENCODED DATABASE IMAGES WITH INPUT SHAPES

BACKGROUND OF THE INVENTION

1. Field of the Invention

The present invention relates to an image processing apparatus and method and, more particularly, to an image processing apparatus and method for searching an image database that stores encoded image data for a desired image.

2. Description of Related Art

In an image search apparatus that stores images in an image database and finds and displays a desired image by search, predetermined index information is saved together with each image to allow an image search. The index information includes, e.g., registration numbers and the like appended in a predetermined format in units of images. However, since the query condition upon searching for a given image is not always information such as a registration number, which is uniquely set for each image, some information that expresses image features must be exploited in the query condition. For example, information that pertains to the shapes, colors, and the like of objects contained in images and is verbally expressed may be used. However, for a shape which is hard to express verbally, edge information or the like detected from an image itself is used.

However, images stored in the image database are normally encoded and compressed. Hence, in order to detect features such as edge information and the like, images must be decoded and expanded prior to detection. Hence, when the number of test images is large or when the image size is large, the search speed lowers.

SUMMARY OF THE INVENTION

The present invention has been made to solve the aforementioned problems, and has as its object to provide an image processing apparatus and method which can search a plurality of encoded image data for a desired image at high speed.

In order to achieve the above object, a preferred embodiment of the present invention discloses an image processing apparatus comprising: storage means for storing a plurality of encoded images; input means for inputting an image shape as information of an image to be retrieved by search; generation means for generating query data on the basis of the input image shape; and determination means for determining similarity between the input image shape and an image, which is expected to be obtained by decoding the encoded data, by comparing the query data and encoded data read out from said storage means.

Also, a preferred embodiment of the present invention discloses an image processing method for searching storage means that stores a plurality of encoded images for a desired image, said method comprising the steps of: inputting an image shape as information of an image to be retrieved by search; generating query data on the basis of the input image shape; and determining similarity between the input image shape and an image, which is expected to be obtained by decoding the encoded data, by comparing the query data and encoded data read out from said storage means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of an image processing apparatus according to the present invention will be described in detail hereinafter with reference to the accompanying drawings.

First Embodiment

Figure 1:
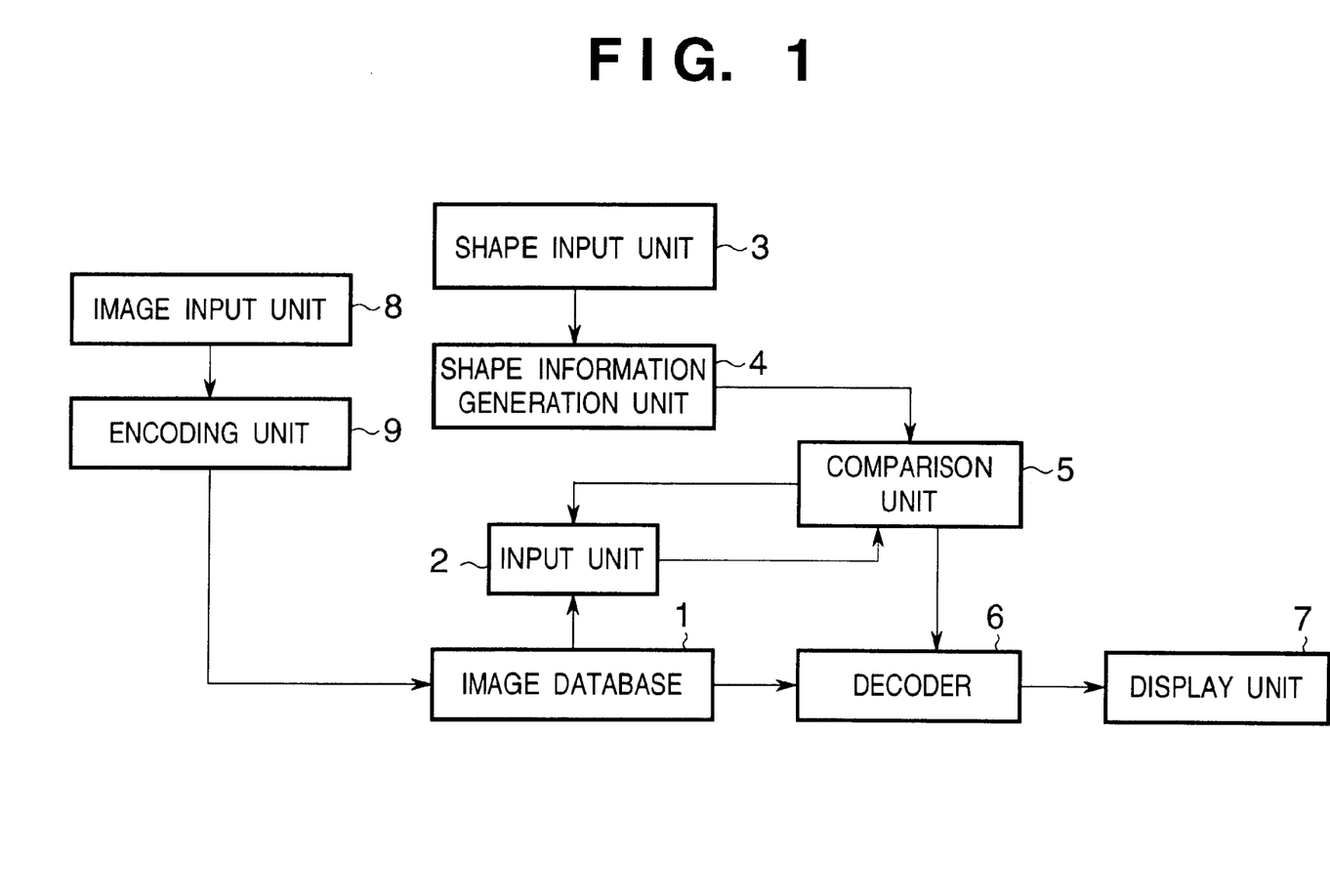
FIG. 1 is a block diagram showing the arrangement of an image search apparatus according to the first embodiment of the present invention.

FIG. 1 is a block diagram showing the arrangement of an image search apparatus according to an embodiment of the present invention. The arrangement and operation of the image search apparatus will be explained below with reference to FIG. 1.

An image database 1 stores a large number of images, which are input by an image input unit 8 and are encoded and compressed by an encoding unit 9. An input unit 2 reads encoded data of a test image from the image database 1 and outputs it to a comparison unit 5. On the other hand, information which is input from a shape input unit 3 as a query condition and pertains to the shape of an image, is processed by a shape information generation unit 4, and is output to the comparison unit 5. The comparison unit 5 compares the data input from the input unit 2 and shape information generation unit 4. When the two data do not satisfy a predetermined condition, the comparison unit 5 sends a control signal that instructs to input encoded data of the next image to the input unit 2. Conversely, when the two data satisfy the predetermined condition, the comparison unit 5 sends a control signal that instructs to decode the corresponding encoded data in the image database 1 to a decoder 6. The decoder 6 reads out the encoded data designated by the comparison unit 5 from the image database 1, decodes it, and sends the decoded data to a display unit 7. Hence, the display unit 7 displays an image that matches the image shape which is input from the shape input unit 3 as a query condition.

The arrangements and operations of the individual units will be described below.

The image database 1 stores test images, and is a storage device using a storage medium such as a hard disk, magnetooptical disk, optical disk, or the like. Individual images stored in the storage device are encoded and compressed, and the encoding procedure and the format of a bitstream generated will be explained below.

Figure 2:
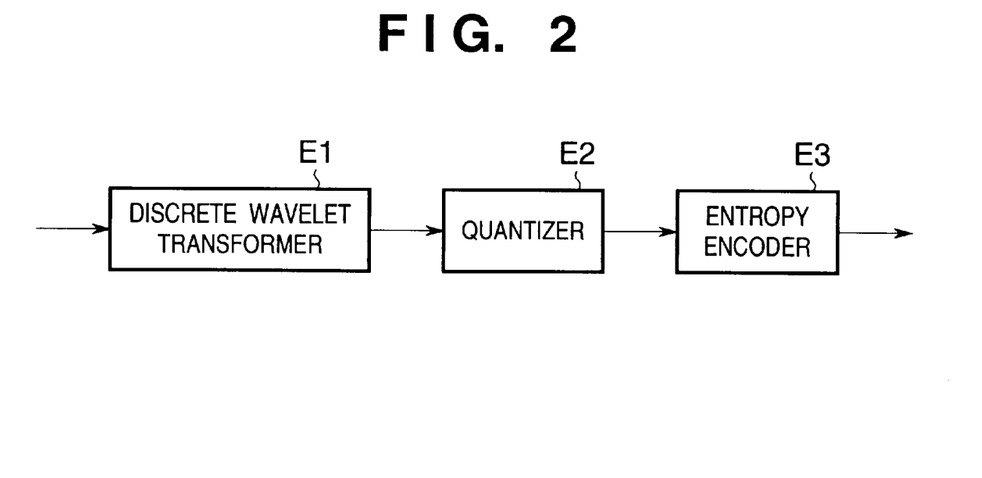
FIG. 2 is a schematic block diagram showing the arrangement of an encoding unit shown in FIG. 1.
Figure 3:
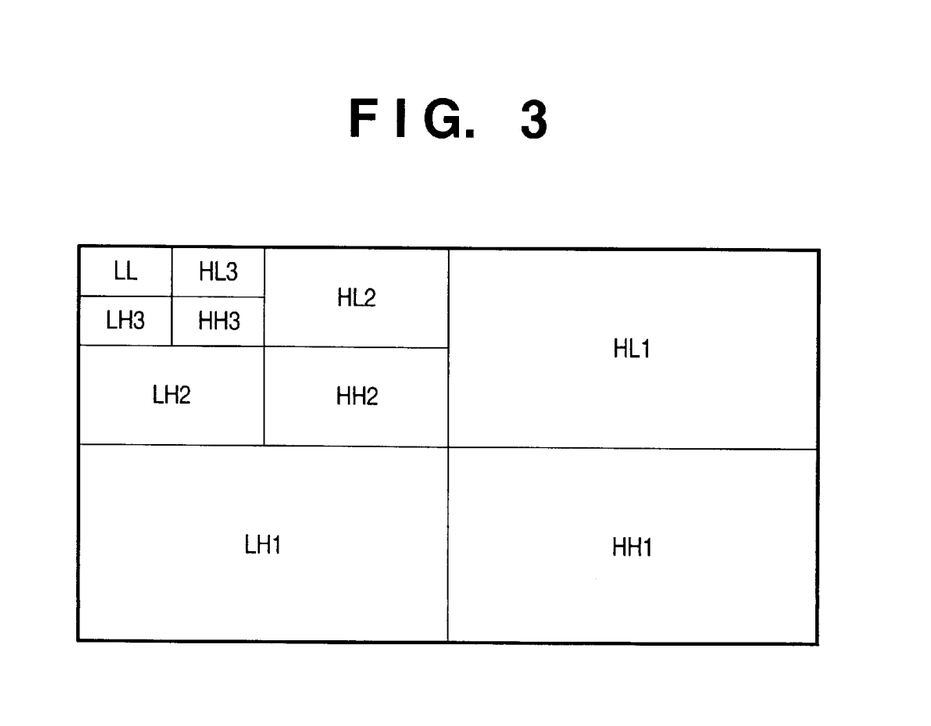
FIG. 3 is a view for explaining sub-bands generated by the discrete wavelet transform.

FIG. 2 is a schematic block diagram showing the arrangement of the encoding unit 9. An image to be encoded undergoes the discrete wavelet transform by a discrete wavelet transformer E1, and is segmented into a series of coefficients which belong to a predetermined number of different frequency bands (to be referred to as sub-bands hereinafter). Since the procedure of the discrete wavelet transform is known to those who are skilled in the art, a detailed description thereof will be omitted. FIG. 3 shows sub-bands obtained by the discrete wavelet transform, and in this example, there are 10 sub-bands. Coefficients which belong to these sub-bands are output in turn to a quantizing unit E2. The quantizing unit E2 quantizes the coefficients of the input sub-bands by a predetermined quantizing step, and outputs quantizing indices to an entropy encoder E3 in units of bit planes. In this embodiment, an identical quantizing step is used for the respective sub-bands, but may be changed in units of sub-bands. The entropy encoder E3 outputs a bitstream obtained by encoding the input quantizing indices in units of bit planes.

Figure 4A:
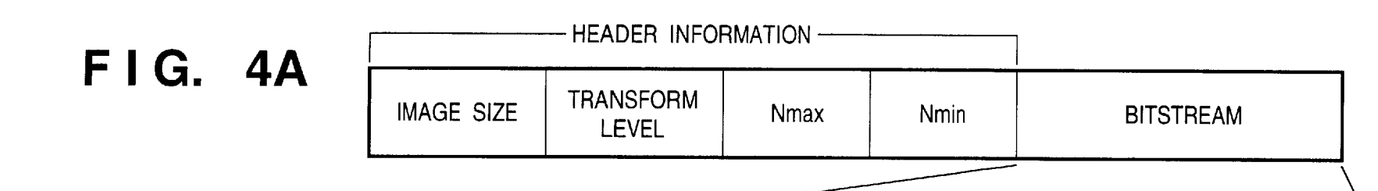
FIGS. 4A and 4B are views for explaining the bitstream of an encoded and compressed image.
Figure 4B:
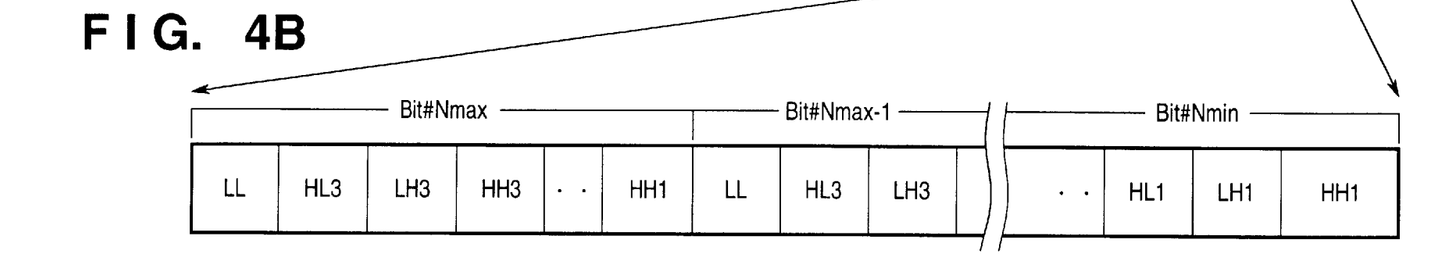

The bitstream obtained in this manner is stored in the image database 1, and has a structure, as shown in FIGS. 4A and 4B. FIG. 4A shows the format of the overall bitstream, in which header information including an image size, transformation level in the wavelet transform, and maximum and minimum bit plane numbers N max and N min, is followed by a bitstream that indicates actual transform coefficients. FIG. 4B shows the format of the bitstream, which consists of a sequence of bit information in units of sub-bands in the order from the maximum to minimum bit planes.

A search method of images stored in the image database 1 in the bitstream format shown in FIGS. 4A and 4B will be explained below.

The shape input unit 3 shown in FIG. 1 inputs an image shape as a query condition, and is constructed by an input device including some means that allows the operator to input a shape, e.g., a pointing device such as a mouse, tablet or the like, and a display device such as a CRT or LCD that allows the operator to visually confirm the input shape. The shape input method is not particularly limited as long as it is normally used in a computer. For example, a shape drawn on the screen may be modified to a desired one by mouse operation. Alternatively, an image that expresses a desired shape may be scanned by an input device such as a scanner or the like. The input data indicating the image shape is output as, e.g., a binary image to the shape information generation unit 4.

Figure 5:
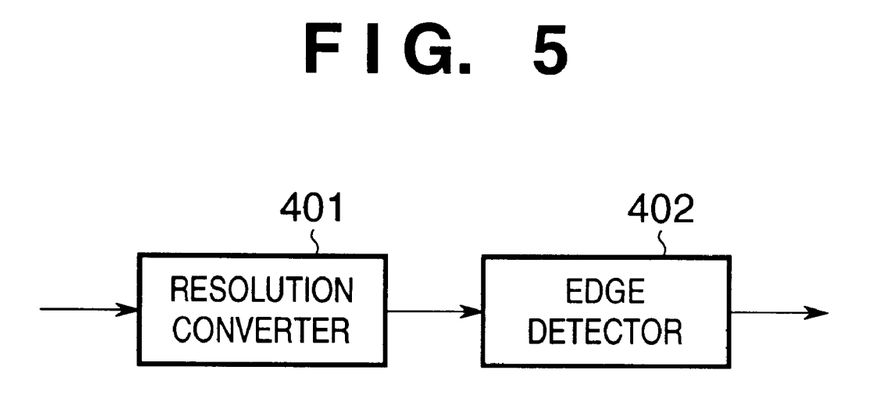
FIG. 5 is a block diagram showing the arrangement of a shape information generation unit shown in FIG. 1.
Figure 6A:
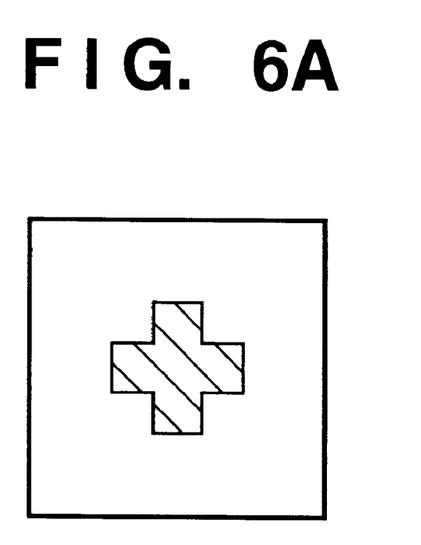
FIGS. 6A and 6B are views for explaining the operation of an edge detector shown in FIG. 5.
Figure 6B:
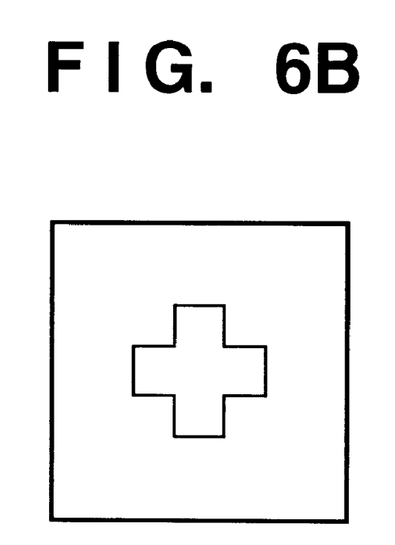

FIG. 5 is a block diagram showing the arrangement of the shape information generation unit 4. A resolution converter 401 converts input shape data into a predetermined size to match it with the resolution of data used in shape comparison. An edge detector 402 detects the edge of the input binary image, and outputs an edge image indicating the detection result. FIGS. 6A and 6B are views for explaining the operation of the edge detector 402. A shape image shown in FIG. 6A is converted into an edge image shown in FIG. 6B, and the converted edge image is output to the comparison unit 5. Note that black pixels that assume a value '1' in the edge image of this embodiment indicate an edge, and other pixels are white pixels that assume a value '0'.

On the other hand, images stored in the image database 1 are read out in turn by the input unit 2. In this case, the bitstream to be read out has the structure shown in FIGS. 4A and 4B. The input unit 2 reads out data of a predetermined level having the same resolution as that of the edge image from sub-bands other than sub-band LL in the bitstream corresponding to bit plane N max, and outputs them to the comparison unit 5. The encoded data input to the comparison unit 5 are entropy-decoded to reconstruct coefficients or indices quantized upon encoding.

Figure 7:
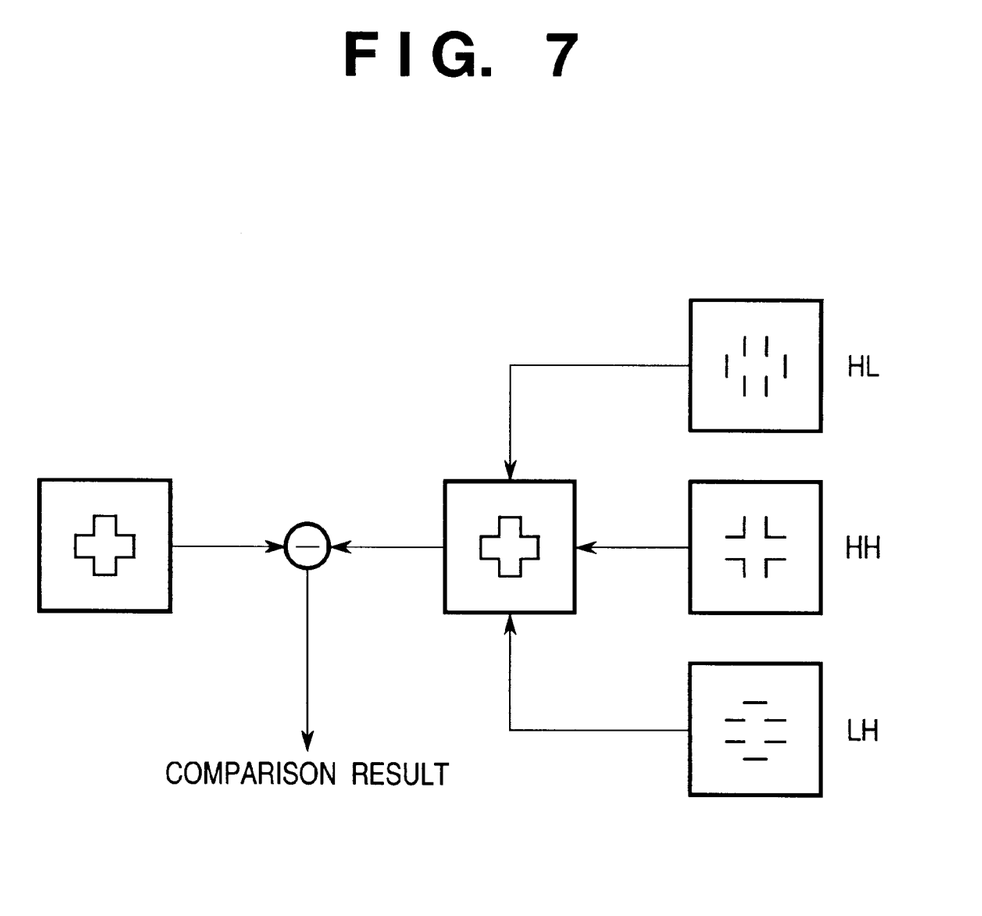
FIG. 7 is a diagram for explaining comparison implemented by a comparison unit shown in FIG. 1.
Figure 8:
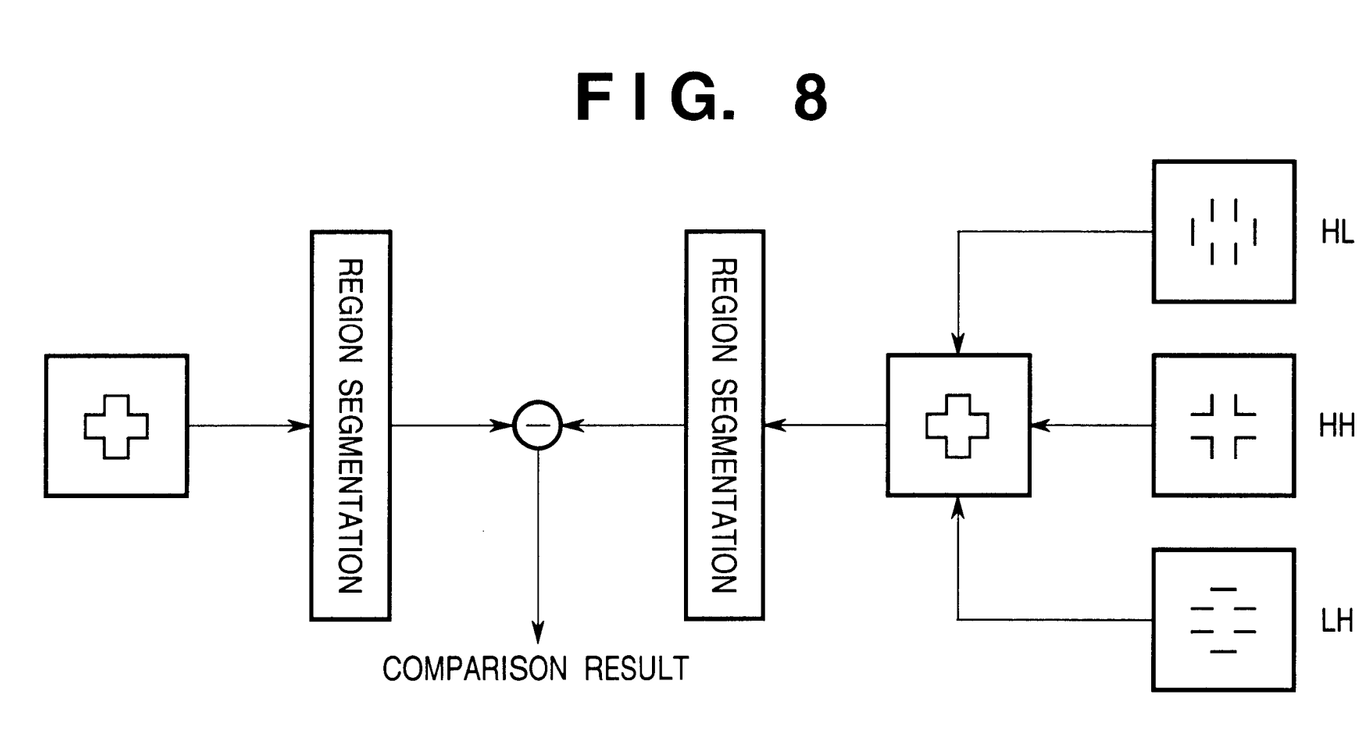
FIG. 8 is a diagram for explaining comparison implemented by a comparison unit according to the second embodiment of the present invention.

FIG. 7 is a schematic diagram showing the comparison procedure between the reconstructed sub-bands and edge image, which is implemented by the comparison unit 5. Input three sub-bands are ORed to be synthesized into a single sub-band, and the difference between the synthesized sub-band and edge image is calculated. Then, a test image or sub-band is segmented into blocks having a predetermined size, and when the sum of the absolute values of the differences in these blocks is equal to or smaller than a predetermined threshold value, it is determined that similarity between the synthesized sub-band and edge image is high. Note that the block size and threshold value are set in correspondence with precision required for search.

When the sum of the absolute values of the differences exceeds the predetermined threshold value, the comparison unit 5 reads encoded data that belong to a lower bit plane from the input unit 2, and executes the same processes as above. Since larger coefficients are concentrated on the edge of an original image, the coefficients of the synthesized sub-bands undergo comparison in turn from upper bit planes in units of bit planes. This means portions with high edge intensity are preferentially compared. As a result, the shape of an object contained in an image can be compared without completely decoding the encoded data, thus efficiently implementing a search process.

When the comparison result between the edge image and synthesized sub-band indicates high similarity, the comparison unit 5 sends a control signal to the decoder 6, as described above, to make it read out and decode the bitstream of the corresponding image from the image database 1. Hence, the processes in the order opposite to those shown in FIG. 2 are executed in the decoder 6 to reconstruct an image, and the reconstructed image is displayed on the display unit 7.

Second Embodiment

In the first embodiment, the size or resolution of the shape image is adjusted to that of the sub-band read from the bitstream. However, in the second embodiment, comparison is made without adjusting their sizes or resolutions.

In this embodiment, assume that the shape information generation unit 4 generates an edge image having an arbitrary size. The comparison unit 5 segments data to be compared into regions, and compares the segmentation results to check similarity. FIG. 9 and FIGS. 10A to 10D are respectively a flow chart and views for explaining the region segmentation method.

In region segmentation, the bit plane of an image or sub-band of interest is recursively segmented, and that segmentation information is output as a 1-bit flag. The flow of this process will be explained below with reference to the flow chart in FIG. 9.

Figure 9:
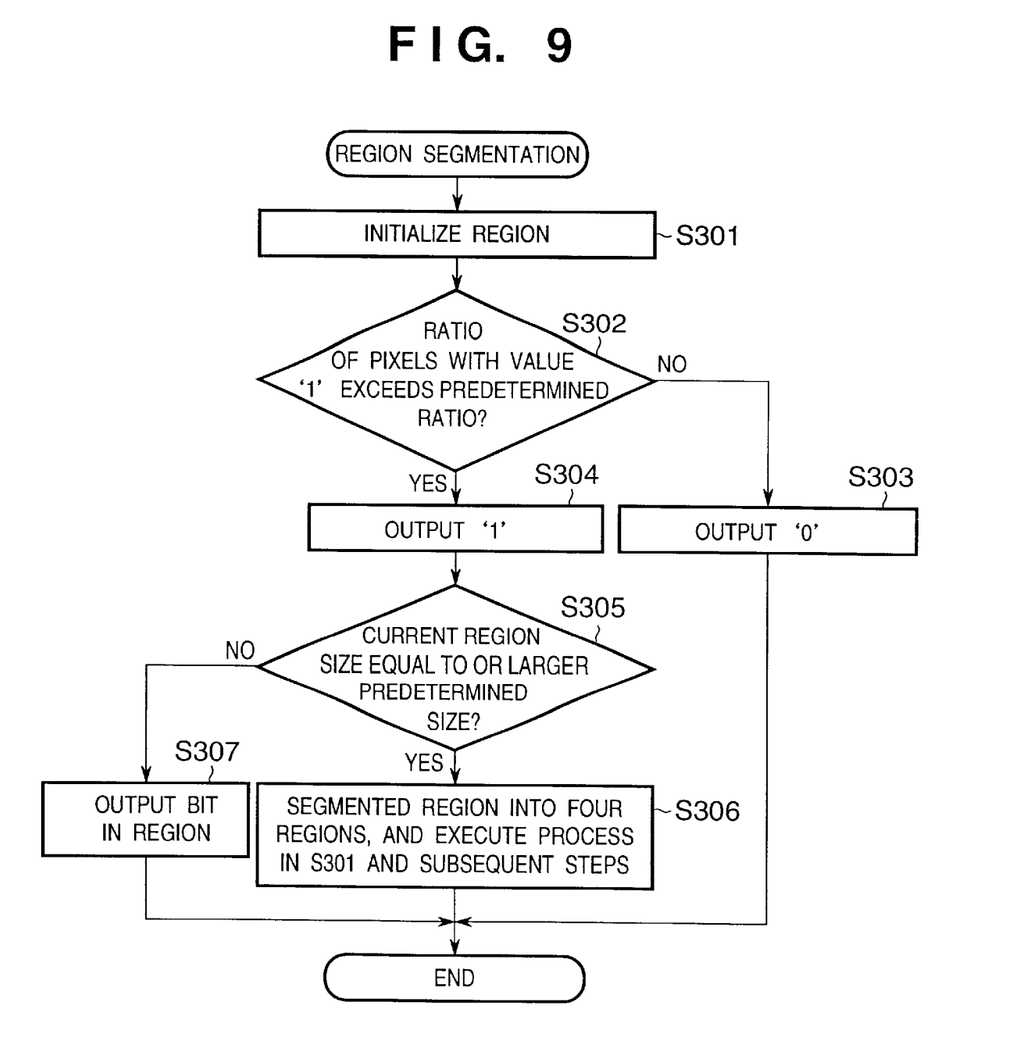
FIG. 9 is a flow chart for explaining the region segmentation method implemented by the comparison unit.

In step S301, the region of interest is initialized. This region corresponds to an edge image input from the shape information generation unit 4 or the bit plane of a coefficient read from the bit stream. In step S302, the current region is scanned, and if ratio of pixels with a value '1' exceeds a predetermined ratio, segmentation information '1' is output in step S304. Otherwise, segmentation information '0' is output in step S303, thus ending region segmentation.

It is then checked in step S305 if the current region size is equal to or larger than a predetermined size. If the current region size is equal to or larger than the predetermined size, the current region is segmented into four regions having nearly the same sizes in step S306, and the processes in step S301 and the subsequent steps are recursively executed for each of the four segmented regions. Otherwise, bit information in the region is output in step S307.

Figure 10A:
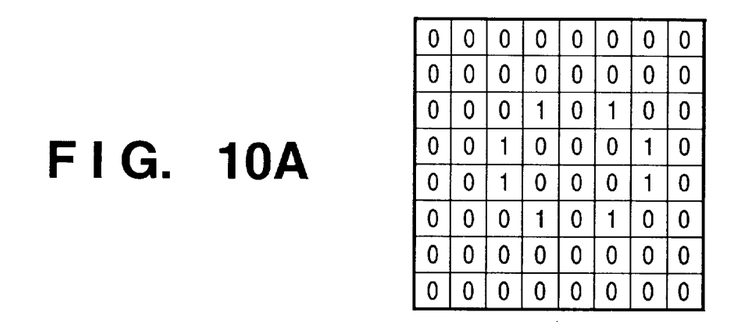
FIGS. 10A to 10D are views for explaining the region segmentation method implemented by the comparison unit.
Figure 10B:
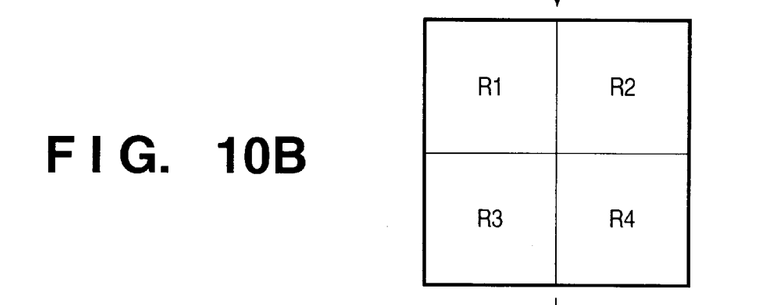
Figure 10C:
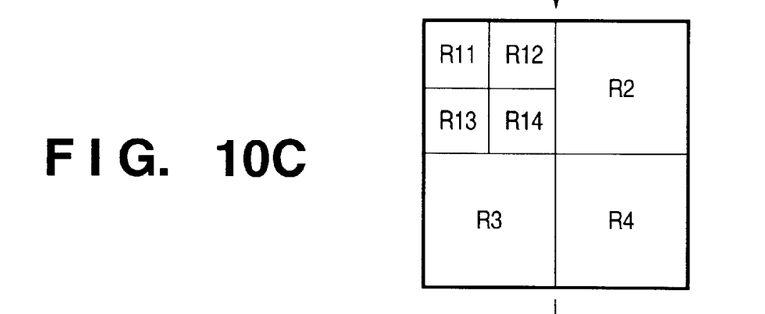
Figure 10D:
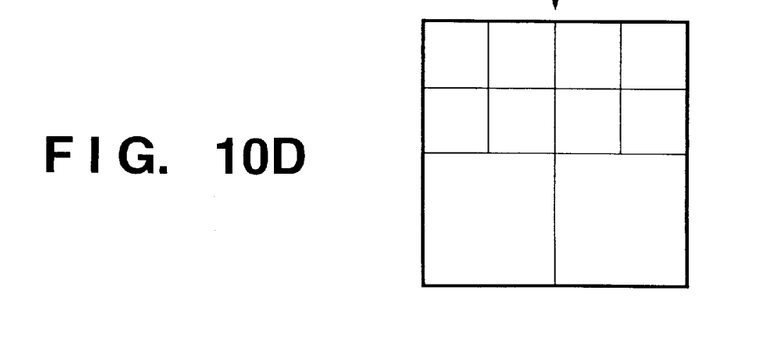

FIGS. 10B to 10D show the flow of region segmentation when an 8×8 (pixel) region shown in FIG. 10A undergoes the aforementioned processes. If the predetermined ratio in step S302 is "the presence of one or more pixels with a value '1'", the region shown in FIG. 10A is segmented into four sub-regions R1, R2, R3, and R4, as shown in FIG. 10B. The same processes are executed for each sub-region, and the region R1 is further segmented into regions R11, R12, R13, and R14, as shown in FIG. 10C. If the predetermined size in step S305 is 3×3 pixels, each of these four regions is not further segmented, and bit data of the regions R11, R12, R13, and R14 are output. The sub-region R2 is then subjected to region segmentation, and is also segmented into four regions, as shown in FIG. 10D. After that, the same processes are done for the sub-regions R3 and R4.

The comparison unit 5 compares the region segmentation information obtained in this manner. When images to be compared have similar '1'-bit distributions, nearly equal region segmentation information is obtained. Hence, a similar image can be detected. Since region segmentation information is compared, the images to be compared need not have equal image sizes. Furthermore, by appropriately selecting region segmentation conditions, comparison can be implemented with desired precision.

In the above description, region segmentation information is compared as needed. Since region segmentation generates four sub-regions, a quaternary tree may be temporarily formed based on these regions, and the nodes of the quaternary tree may be compared.

In each of the above embodiments, the bitstream of an encoded and compressed image consists of discrete wavelet transform coefficients. Alternatively, the bitstream may consist of coefficients obtained by other transforms, e.g., sub-band segmentation. Even when discrete cosine transform coefficients are used, comparison can be made by spatially re-arranging the coefficients upon region comparison.

In each of the above embodiments, quantized coefficients are entropy-encoded upon encoding. Alternatively, coefficients may be replaced by region segmentation information described in the second embodiment upon encoding. In this case, since a bit sequence obtained by segmenting an edge image into regions and the bitstream of an encoded and compressed image can be directly compared with each other in comparison in the search process, the search process can be implemented at higher speed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a storage section arranged to store a plurality of images as encoded data;
   an input section arranged to input an image shape as information of an image to be retrieved by search;
   a generation section arranged to generate query data on the basis of the input image shape; and
   a determination section arranged to determine similarity between the input image shape and an image, which is expected to be obtained by decoding the encoded data, by making a comparison of the query data with the encoded data read out from said storage section,
   wherein the encoded data is obtained by sequentially encoding transform coefficients, which are obtained by a discrete wavelet transformation of an image and said determination section compares the query data and a synthesized sub-band which is the logical combination of a plurality of sub-bands obtained by the discrete wavelet transformation.

2. The apparatus according to claim 1, wherein when the similarity is low, said determination section reads out new encoded data, and compares the new encoded data with the query data.

3. The apparatus according to claim 1, further comprising a decoder arranged to reconstruct an image by decoding the encoded data stored in said storage section on the basis of the similarity obtained by said determination section.

4. The apparatus according to claim 1, wherein the wavelet transformation of the image uses a predetermined number of bit planes.

5. The apparatus according to claim 4, wherein said determination section makes the comparison in units of bit planes read out from the encoded data.

6. The apparatus according to claim 4, wherein said determination section makes the comparison in units of data in a predetermined spatial frequency region read out from the encoded data.

7. The apparatus according to claim 1, wherein the query data is a binary image indicating the image shape.

8. The apparatus according to claim 1, wherein said storage section is a part of an image database.

9. The image processing apparatus according to claim 1, wherein the plurality of sub-bands comprises LH, HH, and HL sub-bands and excludes an LL sub-band.

10. An image processing method for searching a storage section, that stores a plurality of images as encoded data, for a desired image, said method comprising the step of:
    inputting an image shape as information of an image to be retrieved by search;
    generating query data on the basis of the input image shape; and
    determining similarity between the input image shape and an image, which is expected to be obtained by decoding the encoded data, by making a comparison of the query data with the encoded data read out from the storage section,
    wherein the encoded data is obtained by sequentially encoding transform coefficients, which are obtained by a discrete wavelet transformation of an image, and the determining step compares the query data and a synthesized sub-band which is the logical combination of a plurality of sub-bands obtained by the discrete wavelet transformation.

11. The method according to claim 10, wherein when the similarity is low, the determination step includes reading out new encoded data and comparing the new encoded data with the query data.

12. The method according to claim 10, further comprising the step of reconstructing an image by decoding the encoded data stored in the storage on the basis of the similarity.

13. The method according to claim 10, wherein the wavelet transformation of the image uses a predetermined number of bit planes.

14. The method according to claim 13, wherein the determination step includes making the comparison in units of bit planes read out from the encoded data.

15. The method according to claim 13, wherein the determination step includes making the comparison in units of data in a predetermined spatial frequency region read out from the encoded data.

16. The method according to claim 10, wherein the query data is a binary image indicating the image shape.

17. The method according to claim 10, wherein the storage section is a part of an image database.

18. The method according to claim 10, wherein the plurality of sub-bands comprises LH, HH, and HL sub-bands and excludes an LL sub-band.

19. A computer program product storing a computer readable medium having computer program code, for searching a storage section that stores a plurality of images as encoded data, for a desired image, the product comprising code for:

inputting an image shape as information of an image to be retrieved by search;

generating query data on the basis of the input image shape; and determining similarity between the input image shape and an image, which is expected to be obtained by decoding the encoded data, by making a comparison of the query data with the encoded data read out from the storage section, wherein the encoded data is obtained by sequentially encoding transform coefficients, which are obtained by a discrete wavelet transformation of an image, and the determining step compares the query data and a synthesized sub-band, which is the logical combination of a plurality of sub-bands obtained by the discrete wavelet transformation.

20. The computer program product according to claim 19, wherein the plurality of sub-bands comprises LH, HH, and HL sub-bands and excludes an LL sub-band.

* * * * *

UNITED STATES PATENT AND TRADEMARK OFFICE
CERTIFICATE OF CORRECTION

PATENT NO. : 6,532,307 B1　　　　　　　　　　　　　　　　　　　　　　　Page 1 of 1
DATED : March 11, 2003
INVENTOR(S) : Makoto Sato It is certified that error appears in the above-identified patent and that said Letters Patent is hereby corrected as shown below:

Column 6,
Line 33, "step" should read -- steps --.

Signed and Sealed this

Twenty-seventh Day of January, 2004

JON W. DUDAS
*Acting Director of the United States Patent and Trademark Office*